United States Patent [19]

Rousseau et al.

[11] Patent Number: 5,647,270
[45] Date of Patent: Jul. 15, 1997

[54] ELECTRIC TOASTER COMPRISING A DOUBLE-RELEASE CONTROL RACK

[75] Inventors: Alain Rousseau, Le Syndicat; Dominique Marx, Epinal, both of France

[73] Assignee: SEB S.A., Selongey, France

[21] Appl. No.: 666,344

[22] PCT Filed: Dec. 21, 1994

[86] PCT No.: PCT/FR94/01510

§ 371 Date: Aug. 15, 1996

§ 102(e) Date: Aug. 15, 1996

[87] PCT Pub. No.: WO95/17122

PCT Pub. Date: Jun. 29, 1995

[30] Foreign Application Priority Data

Dec. 21, 1993 [FR] France .................. 93 15668

[51] Int. Cl.⁶ .................. A47J 37/08; H05B 1/02
[52] U.S. Cl. .................. 99/327; 99/329 P; 99/329 RT; 99/385; 99/389; 99/391; 219/492; 219/521
[58] Field of Search ............... 99/325–336, 385–402; 219/385, 489, 492, 502, 519, 521

[56] References Cited

U.S. PATENT DOCUMENTS

| | | |
|---|---|---|
| 2,799,216 | 7/1957 | Ireland . |
| 2,849,946 | 9/1958 | Palmer . |
| 3,641,921 | 2/1972 | Toyooka et al. ............... 219/521 |
| 3,880,063 | 4/1975 | Pestka ............... 99/329 R |
| 4,188,865 | 2/1980 | Bjarsch ............... 99/327 |
| 4,791,862 | 12/1988 | Hoffmann ............... 99/385 |
| 5,006,690 | 4/1991 | Cole et al. ............... 219/385 |
| 5,018,437 | 5/1991 | San Juan ............... 99/329 RT |
| 5,072,662 | 12/1991 | Yip ............... 99/327 |
| 5,094,154 | 3/1992 | Nopanen ............... 99/385 X |
| 5,097,751 | 3/1992 | Eisenberg et al. ............... 219/492 X |
| 5,304,782 | 4/1994 | McNair et al. ............... 99/329 R |
| 5,385,082 | 1/1995 | Huggler et al. ............... 99/329 P |

FOREIGN PATENT DOCUMENTS

| | | |
|---|---|---|
| 2.069.381 | 9/1971 | France . |
| 26 24 563 | 9/1977 | Germany . |
| 26 58 997 | 6/1978 | Germany . |

*Primary Examiner*—Timothy F. Simone
*Attorney, Agent, or Firm*—Loeb & Loeb LLP

[57] ABSTRACT

A toasting or heating appliance, particularly an electric toaster comprising a housing with a toasting slot (7) defined by two movable squeezing grills (13), a bread rack (15) axially movable within the toasting slot (7), a carriage (40) which controls the movement of the movable bread rack (15) and is combined with a control handle (16), and a resilient return member (46) for returning the bread rack (15) to its raised receiving position, wherein the control carriage (40) is axially and resiliently movable relative to the movable bread rack (15) and provided with a member (19) that actuates a drive element (45) for moving at least one squeezing grill (13). The appliance is suitable for use as a toaster.

10 Claims, 5 Drawing Sheets

ELECTRIC TOASTER COMPRISING A DOUBLE-RELEASE CONTROL RACK

TECHNICAL FIELD

The present invention relates to the general technical field of electric toasters intended for toasting, or reheating of baked food products, having varying thicknesses, with the aid of heating assemblies associated with grills for gripping the food products.

The present invention concerns an electric toaster comprising a housing with heating elements disposed at opposite sides of a toasting slot delimited by two pressing grills displaceable relative to one another in order to adapt to the thickness of the article to be toasted, said toaster also comprising a bread rack which is movable axially in the toasting slot between a raised position for receiving the article to be toasted and a lowered toasting position.

PRIOR ART

It is already known, for example in the patent application FR-A-2454788, to make an electric toaster of the type mentioned previously, comprising a housing with two toasting subassemblies mounted to be relatively movable opposite one another.

Each toasting subassembly is constituted by a receiver, a heating element such as a rod of refractory material upon which is wound a heating resistance, and a grill intended to come into contact with the slice of bread to be toasted in order to clamp it against the grill of the second subassembly.

The relative displacement of the toasting subassemblies is assured by a system having two branches articulated like scissors associated with the grills, and disposed laterally on the frame of the appliance.

The toaster equally comprises a bread rack which is axially movable, by the intermediary of a manual control piece, between a raised position for receiving the article to be toasted and a lowered toasting position.

In this latter position, the heating circuit of the heating elements is automatically closed and associated with a time delay corresponding to a degree of browning of the bread selected by the user.

When the toasting cycle is terminated, the electric circuit is opened and simultaneously the grills open and the bread rack rises.

Such a toaster is entirely satisfactory when the width of the toasting slot delimited between the two toasting subassemblies does not exceed 35 or even 40 mm. This distance corresponds to standard toasters which are widely available on the market.

With such widths of the toasting slot, the displacement distance of the two toasting subassemblies is sufficiently limited so that no particular problem of blockage, rupture, twisting, poor synchronization of the displacement of the movable pieces occurs. It is then possible to benefit fully from the advantage of such toasters, which because of the mobility of the heating resistances permit maintenance of a constant distance between the article to be toasted and the heating element regardless of the thickness of the article.

This constitutes an element of simplification of the totality of possibilities of regulation of the appliance and leads to a better mastery of the result and the quality of the toasting, and consequently improves overall the homogeneity of the toasting.

The prior art systems, such as those described previously, cannot however be perfectly suitable when it is desired to furnish a toaster having a variable capacity of large width, that is of which the toasting slot can permit the introduction of slices of bread or baked articles having a thickness greater than 35 or 40 mm.

In effect, in such a case, the displacement of the toasting subassembly or subassemblies should be effectuated over a relatively large distance, in a simultaneous and synchronized manner with the movable bread rack, even though because of the presence on each subassembly of several elements, the subassemblies already have a significant weight.

It is important in particular to avoid any risk of blockage of the two toasting subassemblies during raising of the bread rack, in order to assure a good progress of the ejection of the toasted article.

If one wishes at the same time to obtain an electric appliance, such as a toaster, of reduced size, limited cost and manipulation adapted to the thickness of the baked article to be toasted, it proves necessary to envision other solutions.

SUMMARY OF THE INVENTION

The object of the present invention aims precisely at remedying the various difficulties mentioned previously and furnishing an electric toaster permitting facilitation of the simultaneous displacement of the toasting subassemblies of the bread rack, independently of the thickness of the article to be toasted, without risk of blockage and without for that matter increasing the space taken up by, and the cost of, the appliance.

Another object of the invention aims at furnishing an electric toaster of which the operation is simplified and permitting an improvement in the introduction of the article to be toasted.

The objects assigned to the invention are achieved with the aid of an electric toaster comprising a housing with heating elements disposed to one side and the other of a toasting slot delimited by two pressing grills displaceable relative to one another to adapt to the thickness of the article to be toasted, a movable bread rack mounted to be axially displaceable in the toasting slot between a raised position for receiving the article to be toasted and a lowered toasting position, a carriage for control of the displacement of the movable bread rack, associated with a means for control of the displacement, an elastic restoring organ adapted for restoring the bread rack to its raised position, characterized in that the control carriage is mounted to be axially and elastically movable with respect to the movable bread rack between a lowered abutment position and a raised elastic restoring position and is provided with an element for actuating a ramp for driving in displacement at least one pressing grill, said organ acting in the lowered abutment position on the ramp to cause the grills to remain applied against the article to be toasted and acting, during passage to the raised position, on the ramp to assure a pre-disengagement of at least one grill before raising of the movable bread rack.

BRIEF DESCRIPTION OF THE DRAWINGS

Other characteristics and advantages of the invention will become more apparent from a reading of the description given herebelow, by way of nonlimiting examples, with reference to the attached drawings in which.

BEST MANNER OF IMPLEMENTING THE INVENTION

Figure 1:
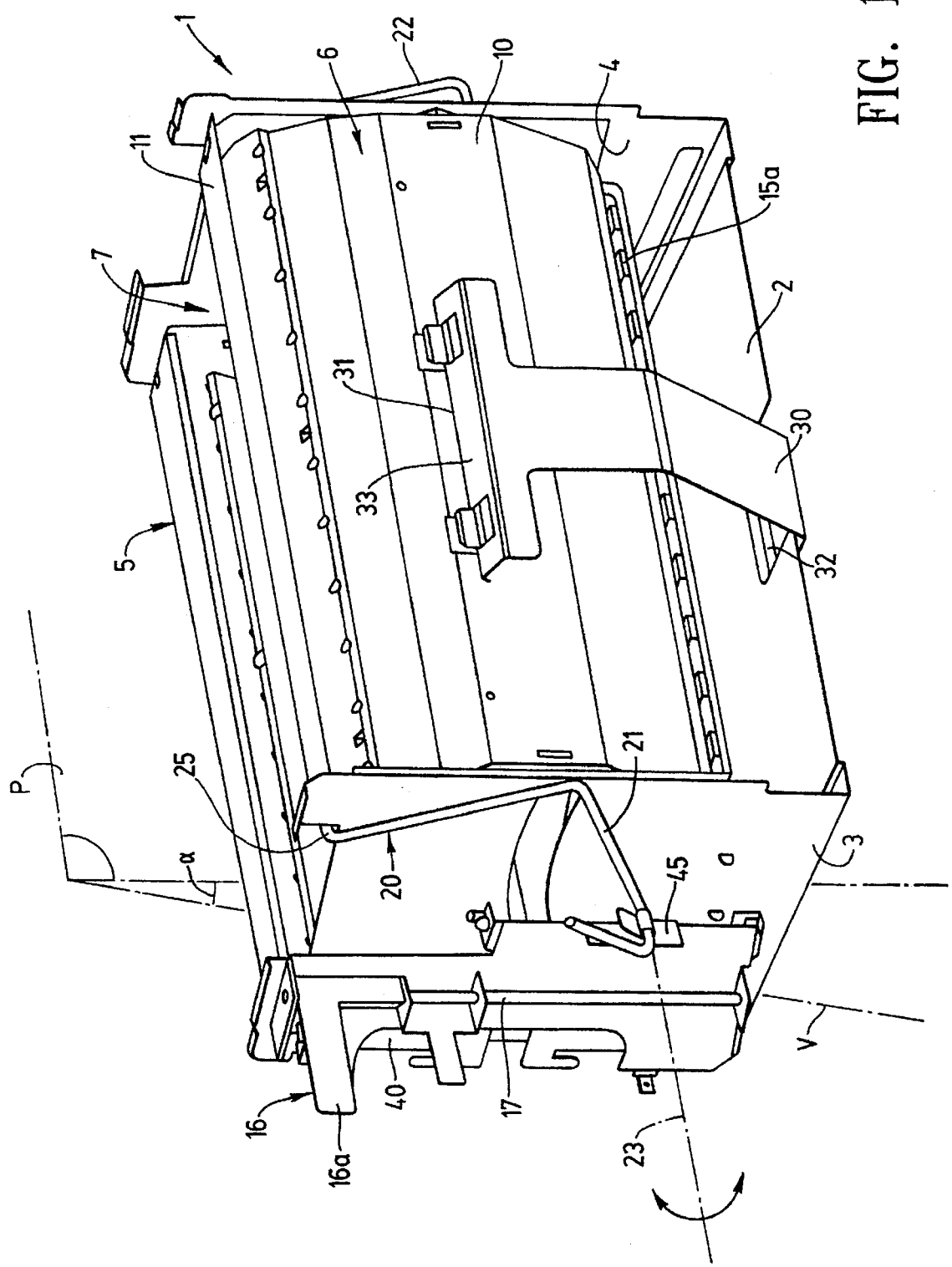
FIG. 1 shows according to a partial perspective view one example of a toaster according to the invention.

FIG. 1 shows the main pieces constituting the internal structure of a toaster according to the invention.

The toaster comprises a housing 1, preferably metal including a bottom 2 connected by its two extremities to two lateral sides 3, 4 and two toasting subassemblies 5, 6, mounted to be relatively displaceable opposite one another on the housing 1 between the lateral sides 3, 4.

The two toasting subassemblies 5, 6 form between them a toasting slot 7 with a substantially vertical plane of symmetry P, said slot having a variable width and able to be adapted to the thickness of the articles to be toasted by relative displacement of the toasting subassemblies 5, 6.

Each toasting subassembly 5, 6 comprises a reflector 10, of a metallic material, presenting a concavity directed toward the toasting slot 7 in a manner to be able to reflect thermal energy in the direction of the article to be toasted.

At least one of the toasting subassemblies 5, 6 comprises in its upper part an edge 11 folded toward the exterior of the toaster.

Each toasting subassembly 5, 6 is equally provided with at least one heating element 12 constituted for example by heating bars including a core made of refractory material, of the steatite type, on which is wound a resistive wire.

The heating elements 12 extend longitudinally in each reflector 10 and are fixed to these latters.

Each toasting subassembly 5, 6 is completed by a clamping grill 13 delimiting between them the toasting slot 7 and joining the upper part of the reflector 10 to its lower part in order to enclose each heating element 12.

The clamping grill 13 is intended to come to enclose articles to be toasted such as slices of bread which are inserted into the toasting slot 7. By way of variation, it is possible to resort to a heating element 12 assuring toasting by contact and not by radiation, such as a contact plate. In this case, the clamping grill 13 of the subassembly or subassemblies 5, 6 can be omitted.

Figure 3:
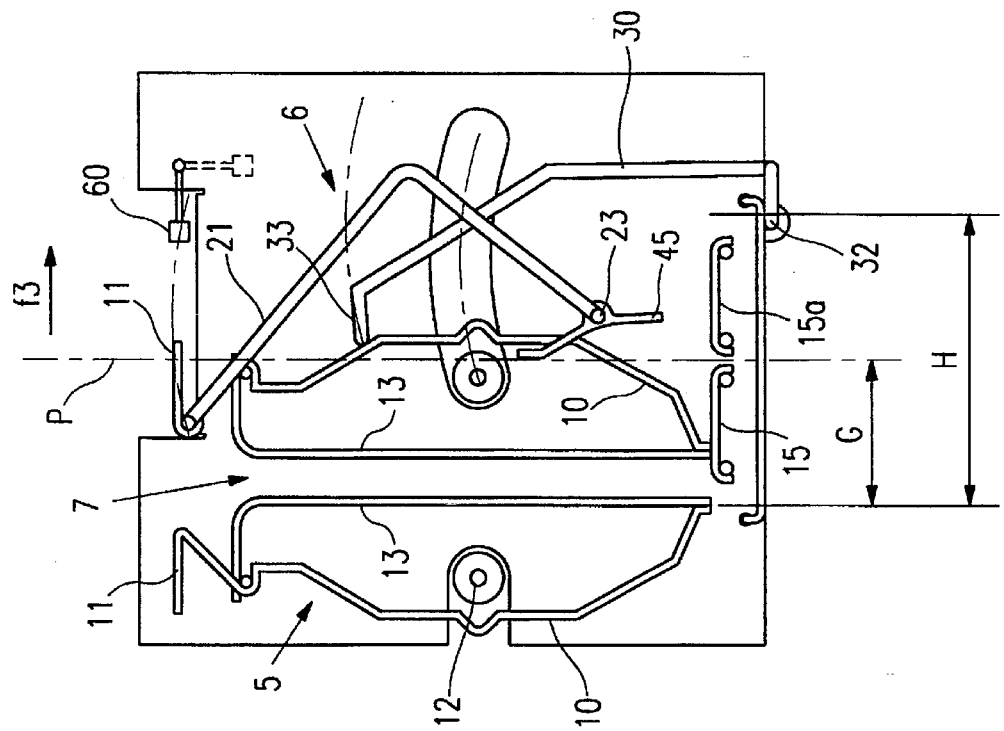
FIG. 3 shows according to a transverse cross section identical to that shown in FIG. 2, a toaster according to the invention in closing position corresponding to the minimum width of the toasting slot.

The toaster according to the invention also comprises, in a known manner, a movable bread rack 15 which is movable in the toasting slot 7 along its axis, preferably substantially vertically between a raised position for receiving the article to be toasted (FIG. 2) and a lowered toasting position (FIG. 3).

The movable bread rack 15, constituted for example by a metal wire mesh element, is fixed to a displacement control means 16 slidably mounted on a column 17. This latter extends substantially vertically along and at the exterior of lateral side 3.

The displacement control means 16 is for example constituted by a control carriage 40 provided with a manipulation arm 16a accessible to the user from the outside of the housing, in order to be able to axially maneuver the movable bread rack 15.

In a manner known per se, the movable bread rack 15 is associated with an actuating means 19 (FIG. 4) able to assure relative moving apart or moving together displacement of the two toasting subassemblies 5, 6.

According to a preferred version of the invention, the toaster is constituted by a fixed toasting subassembly 5 attached to the housing 1, facing a movable toasting subassembly 6. This latter is mounted to be movable away from and toward the fixed subassembly 5 by the intermediary of a support 20 comprising on the one hand, two lateral arms 21, 22 extending along the lateral sides 3, 4. The lateral arms 21, 22 and preferably their lower extremities, are mounted and supported for rotation on the housing 1 about an axis 23.

Support 20 equally comprises an intermediate arm 25, forming a pushing and pulling arm, attached to the movable subassembly 6, and joining the two lateral arms 21, 22.

According to a particular advantageous version of the invention, the support 20 is constituted by a metal rod bent into a U, in such a manner that the two lateral arms 21, 22 and the intermediate arm 25 form a support substantially in a U with the intermediate arm 25 extending along and against the upper part of the movable subassembly 6, and advantageously under the fold formed by the edge 11, bearing against the reflector 10.

Figure 2:
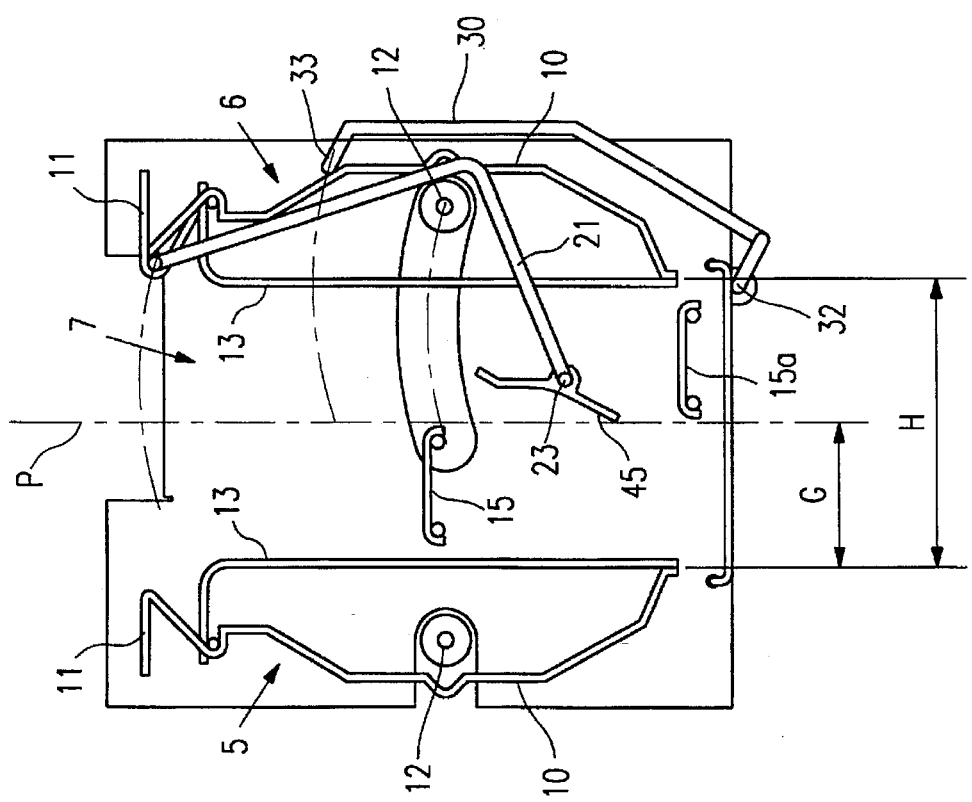
FIG. 2 shows according to a transverse cross section, a toaster according to the invention, in position of maximum opening.

For reasons of space saving and arrangement within the housing 1, each lateral arm 21, 22 can have diverse forms and in particular can form, as shown in FIGS. 2 and 3, a V extending substantially in a vertical plane.

According to another particularly advantageous version of the invention, the movable toasting subassembly 6 is associated with at least one stabilizing arm 30, disposed at the rear face of reflector 10 and connected by a first articulation 31 to said rear face, and by a second articulation 32 to housing 1.

According to a preferred variant of the invention shown in FIGS. 1–3, the stabilizing arm 30 is constituted by a metal plate, preferably in the form of a T whose upper bar 33 is for example attached to the rear face of the reflector 10 in notches, substantially in a centered position. The lower part of the principal branch of the T is fixed, in a preferred manner, to the bottom 2.

The system for displacement of the toasting subassembly 6 described previously, is more particularly, but not exclusively, intended to equip toasters of large width, that is comprising a toasting slot 7 which, in the most greatly spaced position of the two toasting subassemblies 5, 6, is at least equal to 35 mm, and preferably between 35 and 65 mm.

Such toasters imply in consequence a displacement over a relatively long distance of the movable toasting subassembly, all while permitting the introduction of articles to be toasted having substantial dimensions. The displacement system of the movable subassembly 6, formed by the support 20 and the stabilizing arm 30, thus constitute a parallelogram system in which the arms 21, 22 on the one hand, and the stabilizing arm 30 on the other hand correspond to movable connecting rods. In order to maintain, during displacement of the movable subassembly 6, a position of its extension plane which is substantially parallel to the plane P, regardless of the form of the bread, and to conserve an appliance of reduced dimensions, the distance between the axis of rotation 23 and the arm 25 is as large as possible on the one hand, and the distance between the second articulation 32 and the axis of rotation 23 is equally as large as possible on the other hand. The vertical freedom of movement of the movable subassembly 6 is thus limited, while permitting a rotation which is equally limited, of the order of several degrees, around respectively the axis 23, the first articulation 31 and the second articulation 32.

Figure 5:
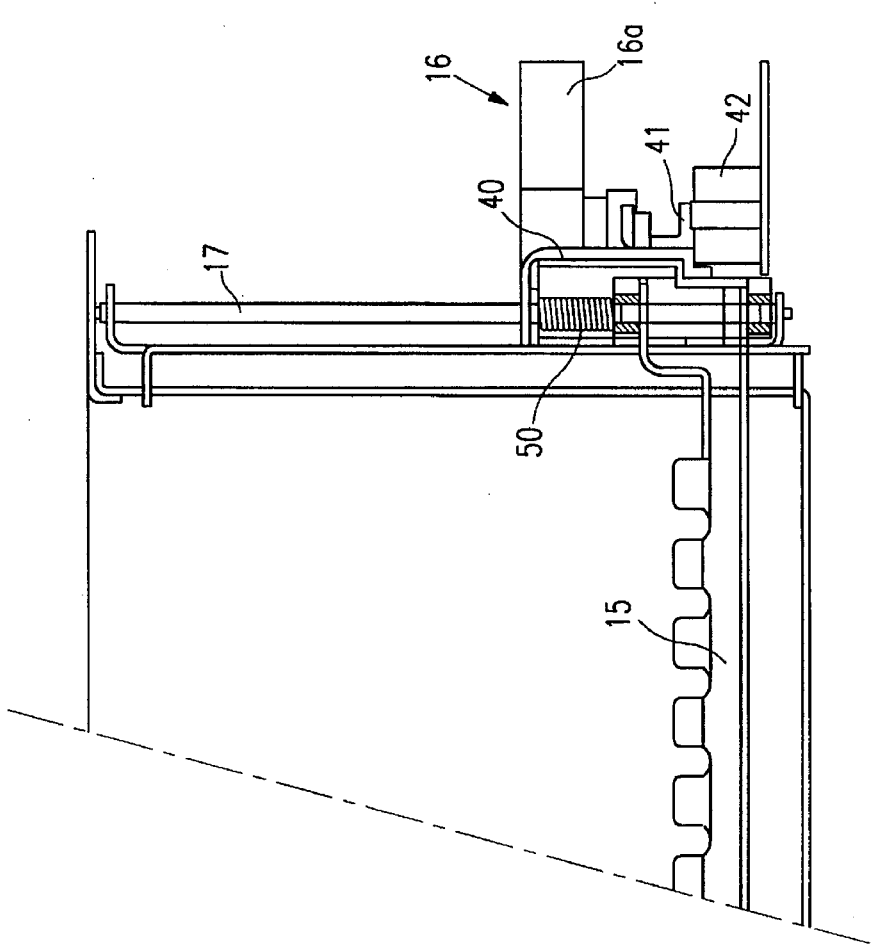
FIGS. 4 and 5 show according to partial side views, offset by 90°, actuating means for displacement of the toasting subassemblies and the lowered position of the control carriage.
Figure 4:
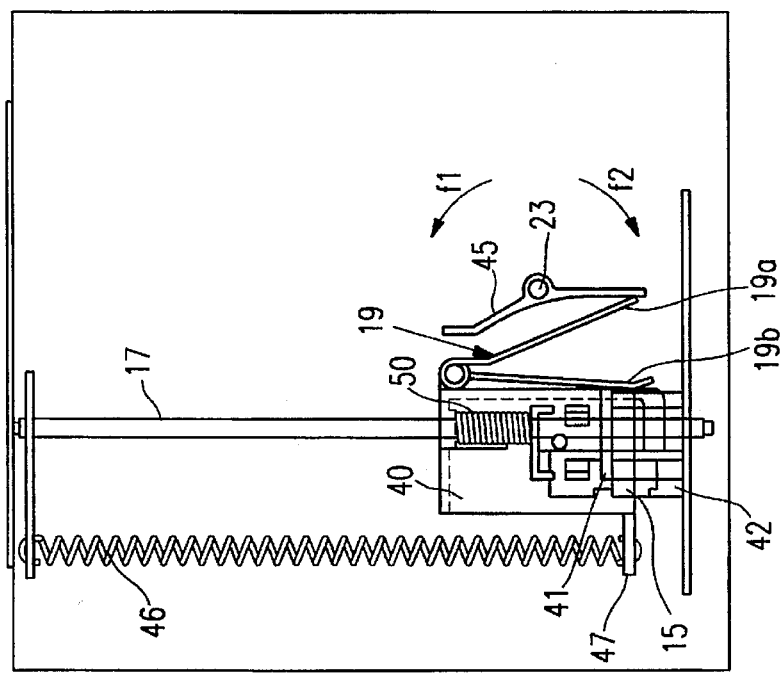
Figure 9:
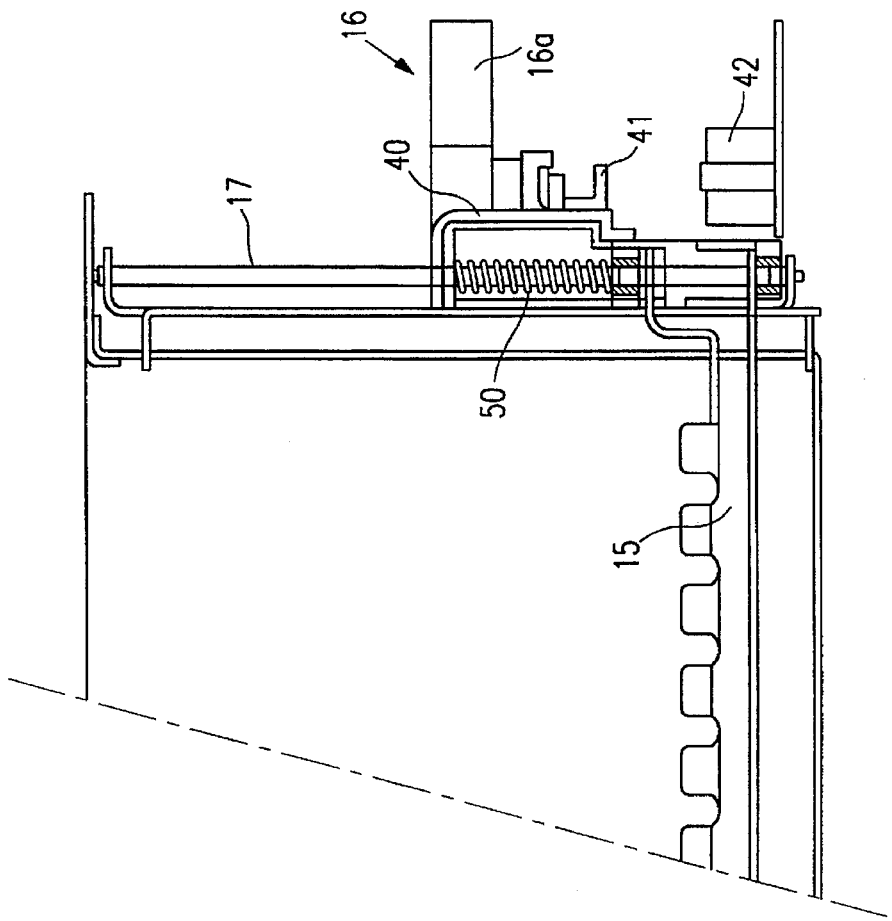
FIGS. 8 and 9 show according to partial side views, offset by 90°, the lowered position of the movable bread rack combined with the raised position of the control carriage.
Figure 8:
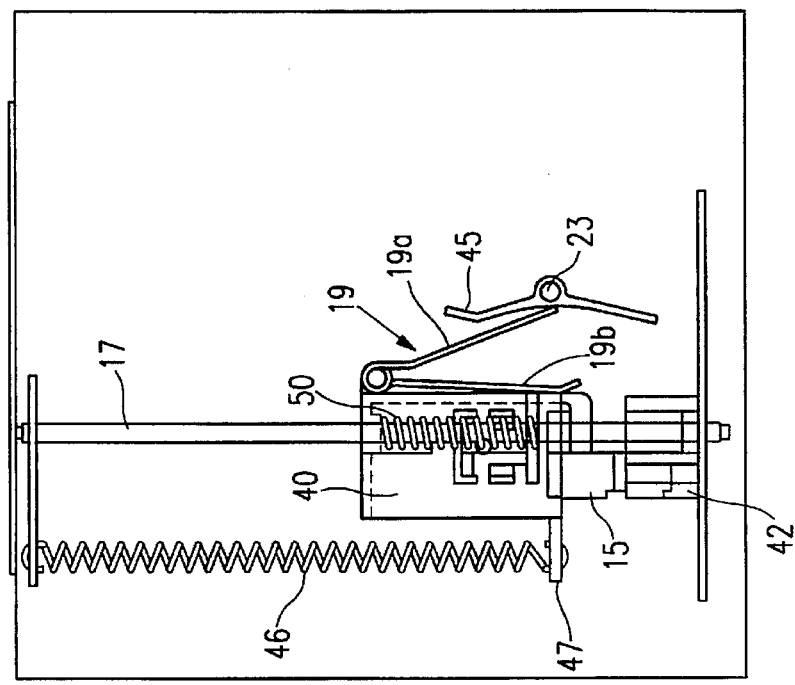

As shown in FIGS. 4 and 5 for example, the displacement control means 16 of the bread rack 15 is constituted by a control carriage 40 slidably mounted on the column 17 and displaceable axially and elastically on this latter, relatively to the movable bread rack 15 along a fixed path, between a lowered abutment position (FIGS. 4 and 5), in which the toasting subassemblies 5, 6 are in operation, and a raised elastic restoring position corresponding to the position for reception of an article to be toasted (FIGS. 8 and 9).

In the lowered abutment position, a polar mass 41, fixed under the control carriage 40, comes to lock onto an electromagnet 42 fixed to the housing 1 in order to close the electric circuit for feeding the heating bars 12.

The electric delay circuit is then triggered and the heating cycle commences.

The control carriage 40 is provided with an actuating organ 19, such as an actuating finger, whose position and size permit it, during descent of the control carriage 40, to come into contact with a driving ramp 45 fixed to the movable toasting subassembly 6. Advantageously, the driving ramp 45 is formed by a foot presenting a concavity directed toward the control carriage 40, said foot being fixed to an extremity of a lateral arm 21 forming the axis of rotation 23.

As a result of this arrangement, the descent of the control carriage 40 permits an actuating finger 19 to come to progressively engage the driving ramp 45 in a manner to impress thereon a rotational movement in the direction of arrow F1, inducing a displacement of the movable subassembly 6, along an approaching direction toward the fixed toasting subassembly 5. In the lowered abutment position, the action of the actuating organ 19 on the driving ramp 45 maintains the movable toasting subassembly 6 substantially elastically applied against the article to be toasted, by the intermediary of clamping grill 13 and the elasticity of support 20.

According to a particularly advantageous version of the invention, the control carriage 40 is urged elastically into its position corresponding to the raised receiving position of the movable bread rack 15 (FIGS. 6 and 7), by an elastic restoring organ 46, such as a helical spring, interposed between the frame and an external foot 47 of the control carriage 40 and maintaining the control carriage 40 in its raised elastic restoring position.

According to another variant of the embodiment, the elastic restoring organ 46 can be interposed between the frame and the movable bread rack 15.

According to a preferred version of the invention, the relative elastic arrangement of the control carriage 40, with respect to the movable bread rack 15, is advantageously realized by interposition of at least one elastic restoring means 50, preferably a compression spring threaded onto the column 17, between the movable bread rack 15 and the control carriage 40. This latter is fixed to the movable bread rack 15 in order to form a coupling. The control carriage 40 is maintained in its raised elastic restoring position by the elastic restoring means 50 whose restoring force is preferably greater than that developed by the restoring organ 46, and in the same direction.

The operation of a toaster according to the invention is the following.

Figure 7:
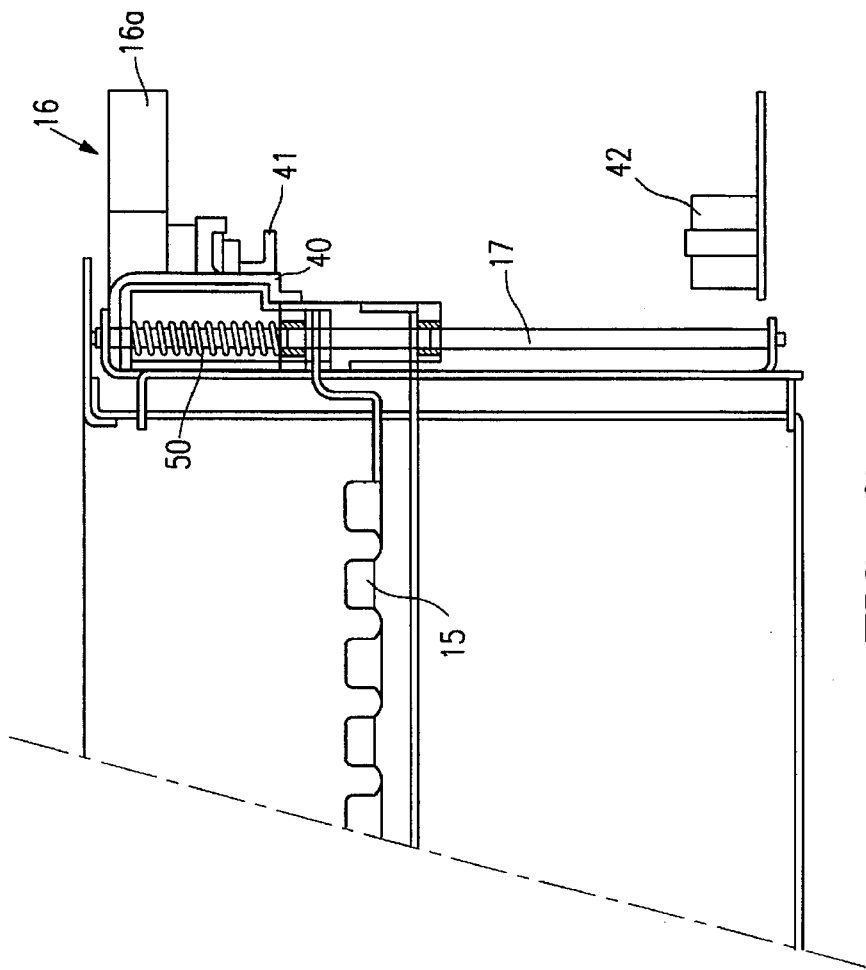
FIGS. 6 and 7 show according to partial side views, offset by 90°, the raised receiving position of the movable bread rack.
Figure 6:
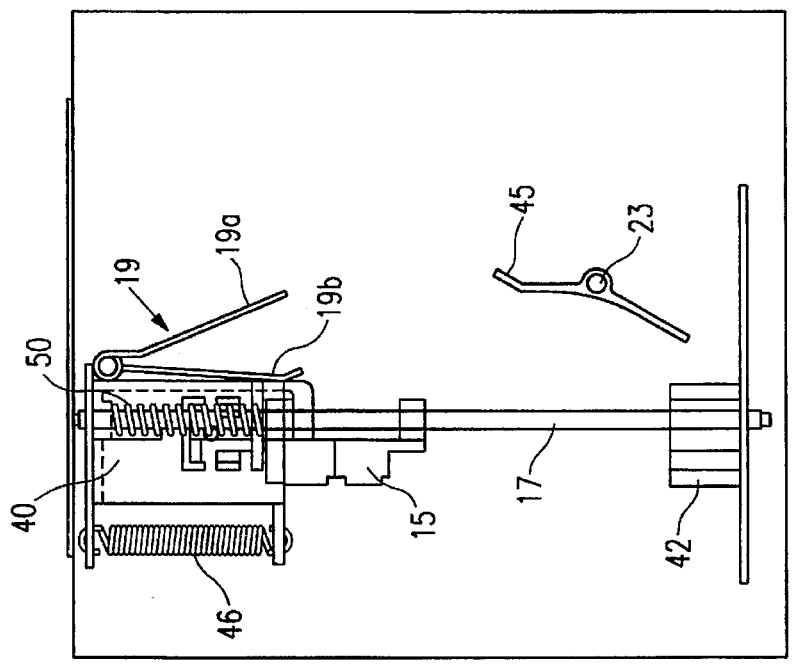

After introduction into the toasting slot of an article to be toasted having a predetermined width, the movable bread rack 15 being in its raised receiving position shown in FIGS. 2, 6 and 7, the user acts manually on the manipulation arm 16a to displace the control carriage 40 toward the bottom, along column 17.

During the course of travel over its descent path, the spring 46 becomes stretched and the control carriage 40 slides toward the bottom driving, by pushing, the movable bread rack 15 toward the bottom. During the course of this lowering operation, the elastic restoring means 50 is not actively solicited in compression and simply maintains the movable bread rack 15 at a constant distance from the control carriage 40, without there being a relative displacement between the two carriages. In its final descending phase, the control carriage 40 comes, by the intermediary of the actuating finger 19, to engage the driving ramp 45 to bring it into rotation in the direction of the arrow F1, and to thus control the displacement of the movable toasting subassembly 6. The final phase of the descending movement comprises first of all a bringing into abutment of the movable bread rack 15 corresponding to its lowered position (FIGS. 8 and 9), then a displacement of the control carriage 40 in opposition to the elastic restoring means 50 in order to come to close the heating circuit and to place in contact the polar mass 41 and the electromagnet 42 (FIGS. 4 and 5).

The actuating finger 19 is advantageously constituted by a metallic pin presenting an elasticity between its arms 19a, 19b, in a manner to permit a pressure constraint of the movable subassembly 6 against the bread which is adaptable and a function of the thickness of said bread. In the embodiment shown in FIG. 4, the arm 19b bears against one face of the control carriage 40, while the arm 19a bears elastically against the driving ramp 45. When the movable bread rack 15 comes to rest against the bottom of the toasting slot 7 such as shown in FIG. 4, the elastic restoring means 50 is progressively constrained, which permits the control carriage 40 to be displaced relative to the movable bread rack 15 in a manner to pass from its raised elastic restoring position toward its lowered abutment position in which the polar mass 41 comes to lock onto the electromagnet 42. In this position, the time delay is triggered, the electric resistances of the heating bars 12 are under voltage and the pressure of the movable toasting subassembly 6 on the article to be toasted is maximum.

In the course of the displacement of the movable toasting subassembly 6 toward the fixed toasting subassembly 5 which is opposite thereto, the pressure of intermediate arm 25 in the upper part of reflector 10, and along the entire length of this latter, in combination with the stabilizing effect in the middle part by the stabilizing arm 30, contributes to an active displacement, balanced and free of deformation, of said movable toasting subassembly 6, regardless of the displacement distance considered.

At the end of the delay time period, the electromagnet 42 is no longer energized and as a consequence frees the polar mass 41.

The spring 46 is retracted and drives the control carriage 40 toward its raised position corresponding to the receiving position of the movable bread rack 15.

Simultaneously, the elastic restoring means 50 relaxes and maintains the movable bread rack 15 in its lowered position, all while permitting the control carriage 40 to move upwardly toward the raised elastic restoring position. During the course of this raising, corresponding to the path of maximal displacement of the control carriage 40 relative to the bread rack 15, the control carriage 40 actuates, by the intermediary of the actuating finger 19, the driving ramp 45, initiating a rotation of this latter in the direction of the arrow F2 and a pre-disengagement of the movable toasting subassembly 6 in a direction away from the fixed toasting subassembly 5. This pre-disengagement is initiated even though the movable bread rack 15 is always in its lowest abutment position which avoids any risk of blockage of the article being grilled due to a poor synchronization between all of the movable parts.

The risks of blockage are particularly increased when the movable parts have a relatively large displacement to effectuate, such as is the case for an electric toaster having a large width.

When the control carriage 40 arrives in its raised abutment position it then drives, in conjunction with the spring 46, the raising of the assembly. During the course of this raising, the actuating finger 19 performs its action on the driving ramp 45, which leads the movable toasting subassembly 6 towards its extreme rest position corresponding to that shown in FIG. 2, in which the width of the toasting slot 7 is maximum.

It should be noted that in the raised position of the movable bread rack 15, it is possible to constrain once again, with the aid for example of another manual manipulation organ, the elastic restoring means 50 toward the top of the toaster which corresponds to a supplemental raising of the movable bread rack 15. This facilitates gripping of the baked article which has undergone toasting, to the extent where it presents a larger part of its surface outside of the toasting slot 7.

According to another embodiment, in particular in the case of a toaster having a large width delimiting a toasting slot at least equal to 35 mm and preferably substantially equal to 65 mm corresponding to the maximum displacement distance H, the toaster comprises a fixed bread rack 15a, mounted to rest at the bottom of the advancing 1. In this case, the fixed bread rack 15a is advantageously mounted substantially opposite the movable bread rack 15 when this latter occupies its lowered toasting position. According to this arrangement, the fixed bread rack 15a is adjacent the movable toasting subassembly 6, while the movable bread rack 15 is adjacent the fixed toasting subassembly 5.

According to another preferred embodiment, there is provided a removable means 60 for limiting the spreading apart displacement of the movable toasting subassembly 6. The removable limiting means 60 is advantageously constituted by a latch mounted on the housing 1, between at least a position for blocking displacement of the movable toasting subassembly 6 and a disengagement position permitting a displacement of said subassembly over the totality of the distance H mentioned previously. In its blocking position, the latch 60 limits the displacement of the movable subassembly 6 along the direction f3 to a distance G, by preventing it from resuming its extreme rest position shown in FIG. 2.

Advantageously, the blocking position of the removable means 60 permits the toasting slot 7 to be limited to a distance at least equal to a value G less than the distance H and corresponding substantially to the width of the movable bread rack 15.

Advantageously, the width of the movable bread rack 15 is substantially equivalent to that of the fixed bread rack 15a and corresponds to one half of the width of the toasting slot 7. On the practical level, the distance H will be at most equal to 65 mm and the distance G at most equal to 40 mm and preferably substantially equal to 30–35 mm.

It is equally particularly interesting to envision equipping the toaster with an electric circuit comprising at least two heating powers, corresponding respectively to a toasting mode utilizing full heating power, and a reheating mode utilizing for example simply one half of the heating power.

According to this arrangement it is then particularly indicated to associate the removable limiting means 60, in a functional manner, to a switch for the electric control of the heating powers, in such a manner that in the position for blocking the return of the movable toasting subassembly 6, the toasting means is automatically selected while the electric circuit for control of the heating bars 12 is closed. On the contrary, in its disengagement position, the removable limiting means permits automatic selection of the reheating mode. This is particularly interesting, to the extent where it is found that articles to be toasted of large width are not generally intended to be toasted but to the contrary intended to be reheated.

According to another embodiment of the invention shown in FIG. 1, it would be of interest to provide the toaster with an inclination with respect to the horizontal.

Such an inclination, of the order of several degrees, for example 10 to 15 degrees, should permit creation of a toasting slot 7 which is inclined in a direction permitting creation of a permanent restoring force acting on the movable toasting subassembly 6 and thus on the article to be toasted to direct them toward the fixed toasting subassembly 5. In practice, this corresponds to conferring an inclination of an angle of the order of 10–15 degrees with respect to the vertical V (FIG. 1), to the plane of symmetry P of the toasting slot 7 and to the planes of extension of the two toasting subassemblies 5, 6, this inclination being directed toward the side of the toaster comprising the fixed toasting subassembly 5.

By way of a complementary variation, it is also possible to produce an appliance in which the toasting slot 7 and the two toasting subassemblies 5, 6, as well as the plane of symmetry P extend substantially horizontally. According to this embodiment, the appliance forms a mini-oven having a variable geometry for foods of all types whether they are solid, liquid or pasty, the movable toasting subassembly 6 forming the upper part of the closure of the appliance.

POSSIBILITIES OF INDUSTRIAL APPLICATION

The invention finds its industrial application in the design and fabrication of toasters.

We claim:

1. Electric toaster comprising a housing 1 with heating elements (12) disposed to one side and the other of a toasting slot (7) delimited by two pressing grills (13) displaceable relative to one another to adapt to the thickness of the article to be toasted, a movable bread rack (15) mounted to be axially displaceable in the toasting slot (7) between a raised position for receiving the article to be toasted and a lowered toasting position, a control carriage (40) for control of the displacement of the movable bread rack (15), associated with a means (16) for control of the displacement and, an elastic restoring organ (46) adapted for restoring the bread rack (15) to its raised position, wherein the control carriage (40) is mounted to be axially and elastically movable with respect to the movable bread rack (15) between a lowered abutment position and a raised elastic restoring position and comprises an element (19) for actuating a ramp (45) for driving in displacement at least one pressing grill (13), said organ (19) acting in the lowered abutment position on the ramp (45) to cause the grills (13) to remain applied against the article to be toasted and acting, during passage to the raised position, on the ramp (45) to assure a pre-disengagement of at least one grill (13) before raising of the movable bread rack (15).

2. Toaster according to claim 1 wherein the movable bread rack (15) and the control carriage (40) are slidably mounted on a column (17) fixed to the housing (1).

3. Toaster according to claim 1 wherein the elastic restoring organ (46) is interposed between the housing and the control carriage (40).

4. Toaster according to claim 1 wherein an elastic restoring means (50) is interposed between the control carriage (40) and the movable bread rack (15).

5. Toaster according to claim 4 wherein the elastic restoring means (50) is a compression spring.

6. Toaster according to claim 5 wherein the compression spring (50) is threaded on a column (17).

7. Toaster according to claim 4 wherein the elastic restoring organ (46) is interposed between the movable bread rack (15) and the housing (1), the elastic restoring means (50) having a restoring force greater than that of the elastic restoring organ (46).

8. Toaster according to claim 1 wherein each grill (13) is connected to a toasting subassembly (5, 6) forming a fixed toasting subassembly (5) and a movable toasting subassembly (6).

9. Toaster according to claim 1 wherein the toasting slot (7) has a maximum width at least equal to 35 mm.

10. Toaster according to claim 9 wherein the width of the toasting slot (7) is between 35 mm and 65 mm.

* * * * *